(12) United States Patent
Allsop et al.

(10) Patent No.: US 8,775,563 B2
(45) Date of Patent: Jul. 8, 2014

(54) DYNAMIC OVERLAYING OF CONTENT ON WEB PAGES FOR TRACKING DATA

(75) Inventors: Brett M. Allsop, Bellingham, WA (US);
Greg Conklin, Seattle, WA (US);
Michael Carreno, Seattle, WA (US);
Alan Lippman, Seattle, WA (US);
Aaron Hill, Bellingham, WA (US); Tom Romary, Mercer Island, WA (US)

(73) Assignee: Yapta, Inc., Seattle, WA (US)

( * ) Notice: Subject to any disclaimer, the term of this patent is extended or adjusted under 35 U.S.C. 154(b) by 502 days.

(21) Appl. No.: 11/943,262

(22) Filed: Nov. 20, 2007

(65) Prior Publication Data

US 2008/0209318 A1   Aug. 28, 2008

Related U.S. Application Data

(60) Provisional application No. 60/866,433, filed on Nov. 20, 2006.

(51) Int. Cl.
*G06F 15/16* (2006.01)
*G06Q 10/00* (2012.01)

(52) U.S. Cl.
USPC ............................................. 709/218; 705/5

(58) Field of Classification Search
USPC ....................................................... 709/218
See application file for complete search history.

(56) References Cited

U.S. PATENT DOCUMENTS

| | | | |
|---|---|---|---|
| 6,643,642 B1 | 11/2003 | Habegger | |
| 6,795,710 B1 * | 9/2004 | Creemer | 455/456.3 |
| 7,647,351 B2 * | 1/2010 | Monsarrat | 715/235 |
| 7,668,811 B2 * | 2/2010 | Janssens et al. | 707/719 |
| 7,698,172 B2 * | 4/2010 | Choe et al. | 705/26.62 |
| 2003/0115111 A1 | 6/2003 | Fisher | |
| 2003/0187877 A1 | 10/2003 | Kuboyama et al. | |
| 2004/0019672 A1 | 1/2004 | Das et al. | |
| 2004/0060008 A1 | 3/2004 | Marshall | |
| 2004/0111417 A1 | 6/2004 | Goto et al. | |
| 2004/0128195 A1 | 7/2004 | Sorem | |
| 2004/0138966 A1 * | 7/2004 | Kopelman et al. | 705/27 |
| 2004/0193457 A1 * | 9/2004 | Shogren | 705/5 |
| 2004/0267824 A1 * | 12/2004 | Pizzo et al. | 707/200 |
| 2005/0160014 A1 | 7/2005 | Moss et al. | |
| 2006/0064333 A1 * | 3/2006 | Razza et al. | 705/5 |

(Continued)

FOREIGN PATENT DOCUMENTS

| | | | |
|---|---|---|---|
| WO | 2001075668 A2 | 10/2001 | |
| WO | 2008064237 A2 | 5/2008 | |

OTHER PUBLICATIONS

Price Grabbing E commerce Website Using ASP.Net and Oracle, Susheel Indrapal, pp. 1-6, 2006.*

(Continued)

*Primary Examiner* — Brian P Whipple
*Assistant Examiner* — James Edwards
(74) *Attorney, Agent, or Firm* — McDermott Will & Emery LLP

(57) ABSTRACT

A computer system for overlaying content in a designated area of a web page is disclosed. The computer system may be used to run executable code configured to identify a data field in a received web page, insert a visible user control substantially adjacent to the data field, display the web page comprising the user control, and cause a value in the data field to be tracked upon actuation of the user control.

16 Claims, 11 Drawing Sheets

(56) References Cited

U.S. PATENT DOCUMENTS

| | | | |
|---|---|---|---|
| 2006/0212321 A1 | 9/2006 | Vance et al. | |
| 2006/0265361 A1* | 11/2006 | Chu | 707/3 |
| 2007/0226640 A1* | 9/2007 | Holbrook et al. | 715/765 |
| 2007/0265923 A1* | 11/2007 | Krassner et al. | 705/14 |
| 2008/0073429 A1 | 3/2008 | Oesterling et al. | |
| 2008/0208606 A1 | 8/2008 | Allsop | |
| 2008/0208817 A1 | 8/2008 | Allsop | |
| 2011/0161351 A1 | 6/2011 | Allsop et al. | |
| 2012/0179673 A1* | 7/2012 | Kelly et al. | 707/731 |

OTHER PUBLICATIONS

International Search Report for PCT Application Serial No. PCT/US07/85261, mailed May 16, 2008.

Office Action, dated Apr. 4, 2009, for U.S. Appl. No. 11/943,278, entitled "Dynamic Price Tracking for Products and Services in Electronic Commerce," filed Nov. 20, 2007.

Google 101: How Google crawls, indexes, and serves the web. Located at http://www.google.com/support/webmasters/bin/answer.py?answer=70897&topic=8843. Printed Apr. 16, 2008. (Admitted to be prior art.).

Extended European Search Report, dated Oct. 6, 2011, for European Patent Application No. 07854728.8 (European Regional Phase of PCT/US2007/085261), "Data Retrieval and Price Tracking for Goods and Services in Electronic Commerce."

Yamana, H. et al. 1998. Experiments of Collecting WWW Information Using Distributed WWW Robots. In Proceedings of the Annual Inernational ACM SIGIR Conference on Research and Development in Information Retrieval, Jan. 1, 1998, pp. 379-380.

Non-final Office Action, dated Apr. 13, 2011 for U.S. Appl. No. 12/848,920, entitled, "System and Method for Retrieving Data Using Agents in a Distributed Network," published Jun. 30, 2011 as US 2011/0161351 A1.

Final Office Action, dated Aug. 11, 2011 for U.S. Appl. No. 12/848,920, entitled, "System and Method for Retrieving Data Using Agents in a Distributed Network," published Jun. 30, 2011 as US 2011/0161351 A1.

\* cited by examiner

DYNAMIC OVERLAYING OF CONTENT ON WEB PAGES FOR TRACKING DATA

CROSS-REFERENCE TO RELATED APPLICATION

The present application for patent claims priority to Provisional Application No. 60/866,433 entitled "System And Method For Tracking Target Assets And Alerting Users Of Changes On A Computer Network," filed Nov. 20, 2006, and assigned to the assignee hereof and hereby expressly incorporated by reference herein.

BACKGROUND

1. Field

The present invention relates generally to consumer transactions in electronic commerce, and more specifically to techniques for tracking data using visible controls in web pages over a network.

2. Description of Related Art

Commercial transactions over the Internet commonly involve business entities that use websites as a platform to market a wide variety of products to consumers. One well known example of such a website is Amazon.com. A typical transaction involves a consumer visiting the Amazon.com website and conducting a query. The user may insert information about a product of interest, as a result of which the user may receive a list of results. These results may include, for example, identities of specific products, prices of the products, features and specifications of the products, and other such attributes. Thereupon, the user may purchase the product by providing information to the website such as a name, address, credit card number, and the like.

Particularly for the consumer who tends to conducts a fair amount of business transactions over the Internet, keeping track of different items on different websites presents unique challenges. For instance, a consumer may place a first item of interest in a shopping cart on a first eCommerce site, a second item of interest in a wish list of a second e-commerce site, and a third item of interest obtained from a query on a third eCommerce site in a file on the user's computer, all with the intention of returning later to make purchasing decisions regarding each of these items. It may, however, be unduly time consuming and duplicative for the consumer to later have to revisit the three sources in order to review the selected items in the course of the decision-making process.

Further, if the consumer had not saved the item in a shopping cart or similar feature on a website, he or she may have to run another query in an attempt to find the item. If the consumer cannot remember the query, the consumer may be relegated to attempting another query. A subsequent query which is not precisely the same as the query executed before, however, may not bring up the originally desired item at the originally desired price. The net result is that the consumer may have to either pay more, lose out on an item, or spend more time completing his transactions.

These examples demonstrate that, as the frequency of a consumer's reliance on eCommerce transactions increases, so too increases the challenge for the consumer to efficiently and accurately to keep track of goods and services of interest to him or her.

The problem is exacerbated where characteristics of a good or service of interest tend to change over time. Many exemplary domains within eCommerce involve goods or services having fluctuating characteristics. One such example is the travel industry. Numerous types of "travel agent" websites exist, such as, for instance, Expedia.com. In addition, airlines often maintain there own websites (e.g. Continental.com) where tickets are sold directly from the airline. In travel websites of these types, myriad options are available to search for information about characteristics of travel assets. Such characteristics may include price and availability for an airline ticket, hotel reservation, and car rental, and like characteristics.

Travel asset characteristics are highly volatile. That is, price, availability, and other characteristics of travel assets tend to change over time. As such, users may desire the ability to track a particular target asset over time. Tracking a target asset typically requires repeatedly visiting a website in order to continually request travel information. Executing multiple queries at multiple times can be difficult and time consuming. This is especially true if the user desires to track more than one item and is targeting assets from more than one website. In these types of situations, valuable information regarding the best deals, optimal travel times, etc. may simply be lost in the mix.

Yet an additional obstacle compounding these difficulties relates to the inefficiency of using information from a first website at a second website. As an illustration a user may visit an online travel agency and find a desired fare. The fare may include a service fee charged by the online travel agency that the user may not otherwise have to pay by purchasing the ticket directly from the airline. The user, having already queried the site that assesses the service charge, may be required to re-enter the query at the airline's website to determine the fare for the ticket. The new search may require entering the ticket information at the airline website in a format which may be different from that of the travel agent website. Such activity may lead to user frustration. Users may be unwilling to spend the extra time conducting multiple queries to find the lowest fare. In short, these and other problems may result in an overall inefficiency and a lack of cohesiveness for consumers monitoring transactional-based data over the Internet.

As a result, a need exists for new techniques for identifying both fixed and volatile assets on the internet, and for streamlining the electronic purchasing process that overcomes the above stated problems with the present state of the art.

SUMMARY

In a computer system, a relevant portion of a web page may be overlayed with content in the form of a user control. When actuated by a user, the user control causes a data value in a data field to be tracked.

A computer system may include a data storage device containing executable computer code, a display, and a processing system associated with the data storage device and the display and configured to run the executable code, wherein the code is configured when run to identify in a received web page a data field that includes a value that may change as a function of time, insert a visible user control substantially adjacent to the data field on the web page, display the received web page including the user control on the display, and issue a command that causes the value in the data field to be tracked upon actuation of the user control by a user.

A computer-program product may include a machine-readable medium including machine executable instructions, the instructions operative to cause a machine to identify in a received web page, a data field including a value that may change over time, insert a user control near the data field, display the web page including the user control on a display associated with the machine, and issue a command to track the value upon actuation by a user of the control.

A computing system may include a data storage device containing first executable code, and a processing system associated with the data storage device and configured to run the first executable code, the first executable code configured to distribute second executable code to a client machine, the second executable code configured when run on the client machine to identify in a received web page a data field, the data field comprising a value that may change over time, insert a visible user control near the data field, display the web page comprising the user control on a display associated with the client machine, and issue a command that causes the value in the data field to be tracked upon actuation of the user control.

A server may include a data storage device, a processing system operative to run a set of executable server code resident in the data storage device, the server code configured when run to distribute a client application to a plurality of client machines on a network upon a request received from one of the client machines, wherein the client application is configured to identify a characteristic of a requested web page, determine whether the identified characteristic matches a known rule, add a user control near a selected data field where the identified characteristic matches the rule, and display the web page comprising the user control on a display device connected to the client machine.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

DETAILED DESCRIPTION

Figure 1:
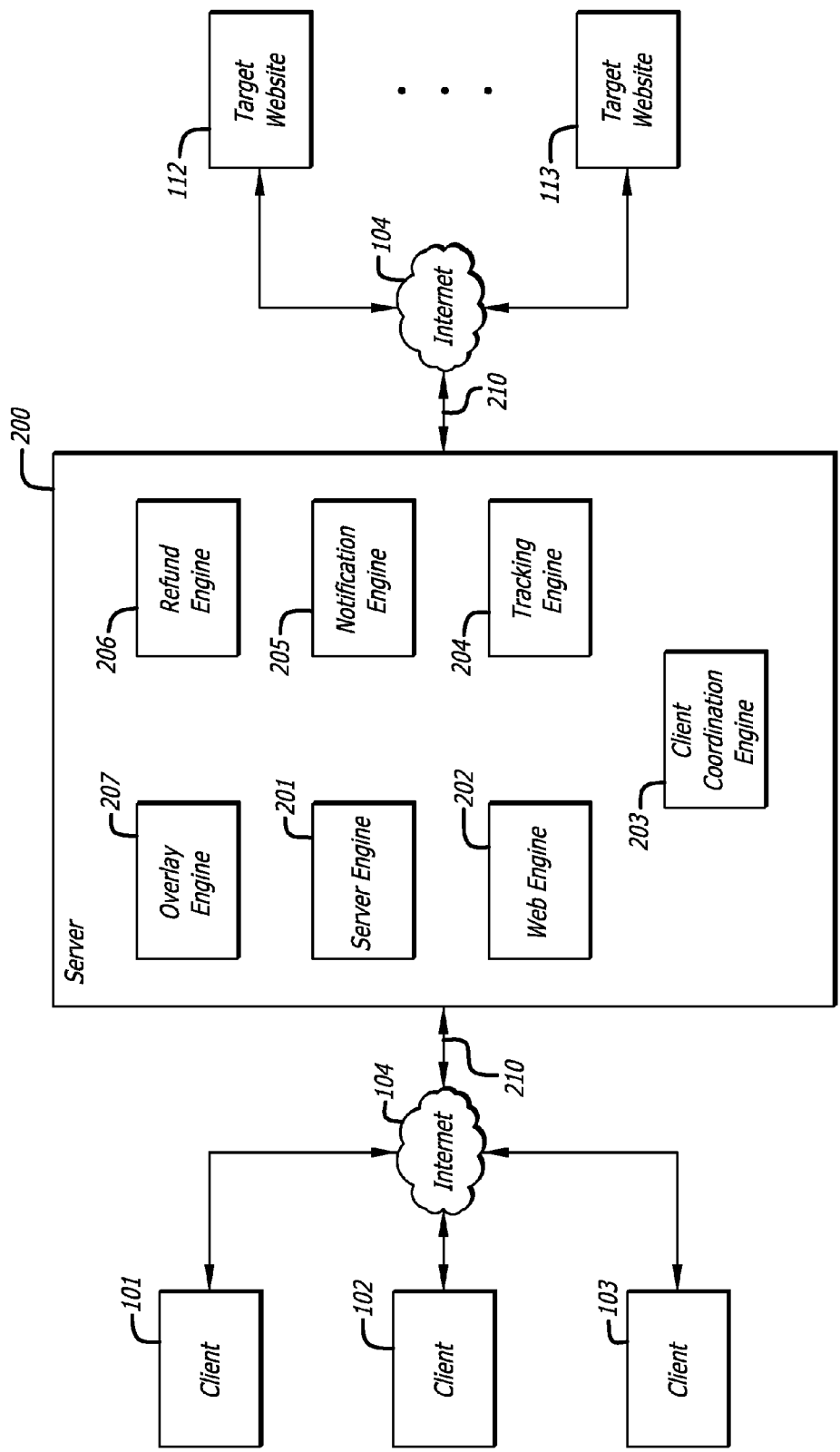
FIG. 1 is a block diagram illustrating an exemplary embodiment of a server system in a distributed network.

Agents may be used in a distributed network to perform queries at nodes from which information can be obtained. A computing system may delegate tasks to perform to the agents at the nodes. When the tasks are performed, information acquired from performing the tasks may be forwarded to the computing system for storage in a central database. Because the tasks are performed by the agents, the data retrieval process according to the present disclosure is not thwarted by blocking software at the nodes.

Below is a description of an Electronic Commerce (eCommerce) based application to which the present disclosure may be applied. It should be understood, however, that the present disclosure is not limited to strict monetary-based eCommerce applications. Rather, the principles herein may be equally applied to other arenas such as blogs, special interest websites, informational websites, politically affiliated nodes, religious websites, databases, and the like. Further, the principles of the present disclosure are not limited to the HyperText Transfer Protocol (HTTP), but may extend to other protocols and configurations (e.g., file transfer protocol, active server pages, common gateway interface, etc.) whether or not web-based.

eCommerce refers generally to commercial transactions conducted at least partially over the Internet. Users may visit an eCommerce website, for example, using a client device (e.g., a computer, mobile phone, etc.) having a user agent (e.g., web browser, screen reader, mobile phone interface, etc.). While visiting a site, users may search for and purchase "target assets," or goods and services of interest to a particular user. The ease with which consumers may search for and purchase target assets, such as airlines tickets, hotel reservations, car rentals, cruise tickets, collectibles, computers, books, etc., has contributed to the popularity of eCommerce. Users are interested in having access to timely, comprehensive and targeted information, meaning that users want immediate access to a high percentage of relevant information and a low percentage of irrelevant information.

eCommerce relates to many different economies, of which travel is reported to be the largest and is therefore an appropriate exemplary economy for eCommerce in general. The present disclosure addresses a number of shortcomings of present eCommerce systems and methods in general, and travel eCommerce systems and methods in particular. The present disclosure addresses, for example, the inability to accurately track a target asset over time.

When a user visits a travel website, such as an online travel agency website (e.g., Expedia.com, Orbitz.com, Travelocity.com, CheapTickets.com, etc.), an airline website (e.g., AlaskaAir.com, Continental.com, Southwest.com, etc.), or other types of travel websites (e.g., Kayak.com, Sidestep.com, Priceline.com, etc.), there are a variety of options for searching for information about a current characteristics of a travel asset (e.g., price and availability for an airline ticket, hotel reservation, car rental, cruise ticket, etc.).

However, given that travel asset characteristics are highly volatile, having over a million daily changes to airline data alone, this type of snapshot information may fail to provide a user with adequate information to make an informed decision. Accordingly, users may desire the ability to track a particular target asset over time. A user may, for example, set up a target asset alert at an online travel agency website or airline website and receive periodic updates of "subscription travel information," where subscription travel information may be defined as the information automatically distributed from a source of travel information. However, subscription travel information may be different than "browser travel information," where browser travel information may be defined as the information that is delivered in response to a request during a period of interactivity between a user agent and a source of travel information, such as a HTTP response delivered from a web server in response to an HTTP request from a web browser or other user agent. For example, an airline may make its best fares available only on its own website such that a particular fare may be delivered to browsers via browser travel information and not delivered to subscribers via subscription travel information.

Although a user may track a flight by repeatedly visiting a website in order to continually request browser travel information, as noted above, this method for price tracking may lead to user frustration due to the amount of time required to track a target asset. Furthermore, if a user relies on manually searching for target assets and a dramatic fluctuation occurs (e.g., a fare for an airplane tickets drops), the user may be unaware of and unable to take advantage of the fluctuation because the delivery of the information was not timely.

A centralized server system configured to "scrape" information from travel websites may attempt to provide a user with browser travel information by mimicking the functionality of or impersonating a web browser. However, as described above, travel websites may be configured to prevent this type of behavior. For example, a website may be configured to ignore requests from a particular internet protocol (IP) address, a range of IP addresses, and/or a user-agent signature, or take other actions to prevent a centralized server system from providing users with comprehensive and targeted travel information. As described above, the present disclosure describes an apparatus and method for delegating server queries which overcomes this problem.

The present disclosure further overcomes many of the shortcoming of current eCommerce systems and methods as they relate to refund tracking. Because the price of a target asset may change after a user makes a purchase, the user may be entitled to a refund, credit, or other consideration. However, repeatedly checking to see if a price has changed may be time consuming. Furthermore, because airlines may want to prevent high-priced fare purchasers from receiving a refund, determining refund policies and processes might be made intentionally challenging for a user. These and other factors may collectively prevent a user from claiming a refund or credit to which the user is otherwise entitled. The present disclosure describes an improved system and method for tracking a price in order to provide a user with notification of an applicable refund under a variety of conditions.

The present disclosure further overcomes many of the shortcomings of current eCommerce systems and methods as they relate to the inefficiency of using information from a first website at a second website. For example, if a user visits an online travel agency and finds a desired fare, the fare may include a service fee charged by the online travel agency that the user would not have to pay by purchasing directly from the airline. Having to enter the ticket information (e.g., flight, departure and arrival airports, date, number of passengers, etc.) at the airline website may lead to user frustration. Some users may not be willing to duplicate their efforts, or may be unaware that lower fares are offered at the airline web site, thereby causing the users to pay higher fares for a ticket. Similarly, a user may want to track a fare over time using a third-party website, but having to enter the ticket information of a discovered flight into the third-party site may prevent the user from tracking the fare. The present disclosure addresses these and other problems by providing tag overlay capability as well as dynamic asset tracking.

Embodiments of the present invention include a method and system for distributed, iterative, and enhanced travel search. Exemplary applications of the present invention include a server system configured to coordinate searches of distributed client applications, a server system configured to track refunds for a purchased asset, and a client overlay tool configured to overlay supplemental content on a certain web pages, such as travel-related web pages.

Embodiments of the present invention may provide for the following systems and corresponding methods. Specifically, the present invention may provide for managing a network of distributed client executables configured to perform target asset queries. The server system includes a tracking engine that stores what target assets are to be tracked and what users are to be notified when an attribute of a target asset changes. Additionally, the server system has a client coordination engine that communicates with the client executables, including periodically sending tasks to the distributed client executables based on the tracking rules. These tasks include querying a target website (e.g., querying a travel website for the price of a particular ticket) and reporting the retrieved information to the server system. The client coordination engine, as described in greater detail below, may send a task to a first user client despite the fact that this task relates to a second user's tracking rule such that the first user's client may be conducting a query on behalf of a second user.

Additionally, the server system includes a refund engine that allows users to track an asset for the purpose of receiving an alert when a refund is available. By storing characteristics of a purchased asset, the system may periodically query the asset source for updated information about the source and the source's refund guidelines. By knowing what a user paid for the asset, the current price of the asset, and the guidelines of the source, the refund engine may determine when a rebate is available and notify the user accordingly.

The server system additionally includes an overlay engine that store overlay rules. These overlay rules determine whether content will be added to a received web page (e.g., whether the page is an overlay page) and what content will be added. A particular example includes overlaying travel information to a results page from an online travel agency website, such as a "buy direct" hyperlink that enables a user to buy a ticket directly from the source without having to re-enter the ticket information and a "track this flight" hyperlink that enables the user to receive periodic updates about changes to the cost of a corresponding flight.

FIG. 1 is a block diagram illustrating an exemplary embodiment of a server system in accordance with the present disclosure. Shown are server system 200, target websites 112, 113, and clients 101, 102, 103. These devices communicate over a network, such as the Internet 104. For purposes of this disclosure, a client acts as an agent on behalf of server 200 when it performs tasks or runs queries and returns the results of those tasks or queries to server 200.

The server 200 is a computer or group of computers (further illustrated in FIG. 11) that, depending upon the application, may perform both server and client-related tasks as those terms are used in the art. For clarity, however, the terminology "server" is simply used to distinguish this system from the distributed clients in the network and the target websites.

Server system 200 supplies the resources (e.g., processors, memory, operating system, etc.) necessary for running a number of engines of executable code to implement the techniques described in this disclosure. Server system 200 includes server engine 201, web engine 202, client coordination engine 203, tracking engine 204, notification engine 205, refund engine 206, and overlay engine 207, as well as communication interface 210. Each of these engines may include hardware, software, power, and networking assets, as described in greater detail below with reference to FIG. 11. Additionally, server system may be implemented on a single server, on a plurality of task specific servers (e.g., a database server and a web server), a plurality of redundant servers, or using other configurations. Server system 200 need not be located in a single location.

Server engine 201 handles coordination between the various engines 202-207. Web engine 202 handles web requests from clients 101, 102, 103 and provides appropriate web responses. Users may manage which assets they are tracking, notification settings, refund information, etc., by interacting with web engine 202. Client coordination engine 203 handles communication between client executables distributed to clients 101, 102, and 103 including task assignment and response retrieval. Additionally, client coordination engine 203 distributes overlay rules used in the overlay tools (depicted in FIG. 2) to clients 101, 102, and 103. Client coordination engine 203 may communicate with client executables in a variety of methodologies including poke (e.g., where client coordination engine 203 initiates communication with client device 101, 102, 103), client-initiated (e.g., where client device 101, 102, 103 periodically request updates from client communication engine 203), a combination thereof, and other methodologies.

Client coordination engine 203 works directly with tracking engine 204 to ensure that target assets are periodically checked. Tracking rules, which identify a target asset to be tracked and a user to be notified when a characteristic of the target asset changes, are stored in the tracking engine 204. Periodically, server engine 201 will identify tracking rules that need to be executed and deliver these to client coordination engine 203 for delegation to the client executables. The user may modify tracking rules associated with the user's account by interacting with web engine 202, such as changing a price threshold or reporting frequency for a particular asset. In one embodiment, a first user's client device may be assigned a task on behalf of a second user, thereby ensuring that the information is periodically updated even if a user is not able to perform a query directly. When updated information is received, it may be delivered to notification engine 205 to determine what users should be notified of the updated information and how these users should be notified. For example, notification engine 205 may first determine whether a price variance threshold has been met (e.g., if a user has specified that changes are to be reported for $25 changes and the price has changed by $50, the notification engine 205 may prepare a notification) and whether a preference setting allows for notification (e.g., if a user has specified to receive updates only daily and a notification has already been sent, the notification engine 205 may withhold or defer the notification).

Refund engine 206 stores store refund guidelines for target asset providers as well as target asset characteristics (e.g., purchase price, airports, flight number, and airline). Server engine 201 may create a tracking rule in tracking engine 204 and periodically query target websites 112, 113 (or delegate tasks to clients 101, 102, 103 to query target website 112, 113) to monitor price changes of the target asset. When a price changes, refund engine 206 may determine whether a refund is due based on the refund policy or guideline for a particular vendor and the amount of the difference between the purchase price and the current price. If a refund is due, server engine 201 may provide this information to notification engine 205 so that the user may be notified. Alternatively or additionally, the refund engine 206 may simply identify a price change and a reference to the guideline (e.g., a hyperlink to an airline's return policy web page) and allow a user to determine whether a refund is due.

In one embodiment, entitlements to a refund, discount, or other benefit may be stored as one or more tracking rules, which may be stored in the refund engine 206 or in the tracking engine 204. In this embodiment, where the rule authorizes an action, this information can be communicated to a user so that the user can receive the associated benefit. Thus, for example, if the tracking rule is that a refund is authorized by the target asset provider if the price of a target asset changes from $200 to $100, and if the tracked price drops to $100, then this information may be communicated to a user so that he can receive the benefit of the refund (e.g., a $100 credit).

Furthermore, as described in greater detail below, refund engine 206 may claim the refund on behalf of the user automatically or semi-automatically, in accordance with user preferences, global preferences, or other criteria.

Figure 2:
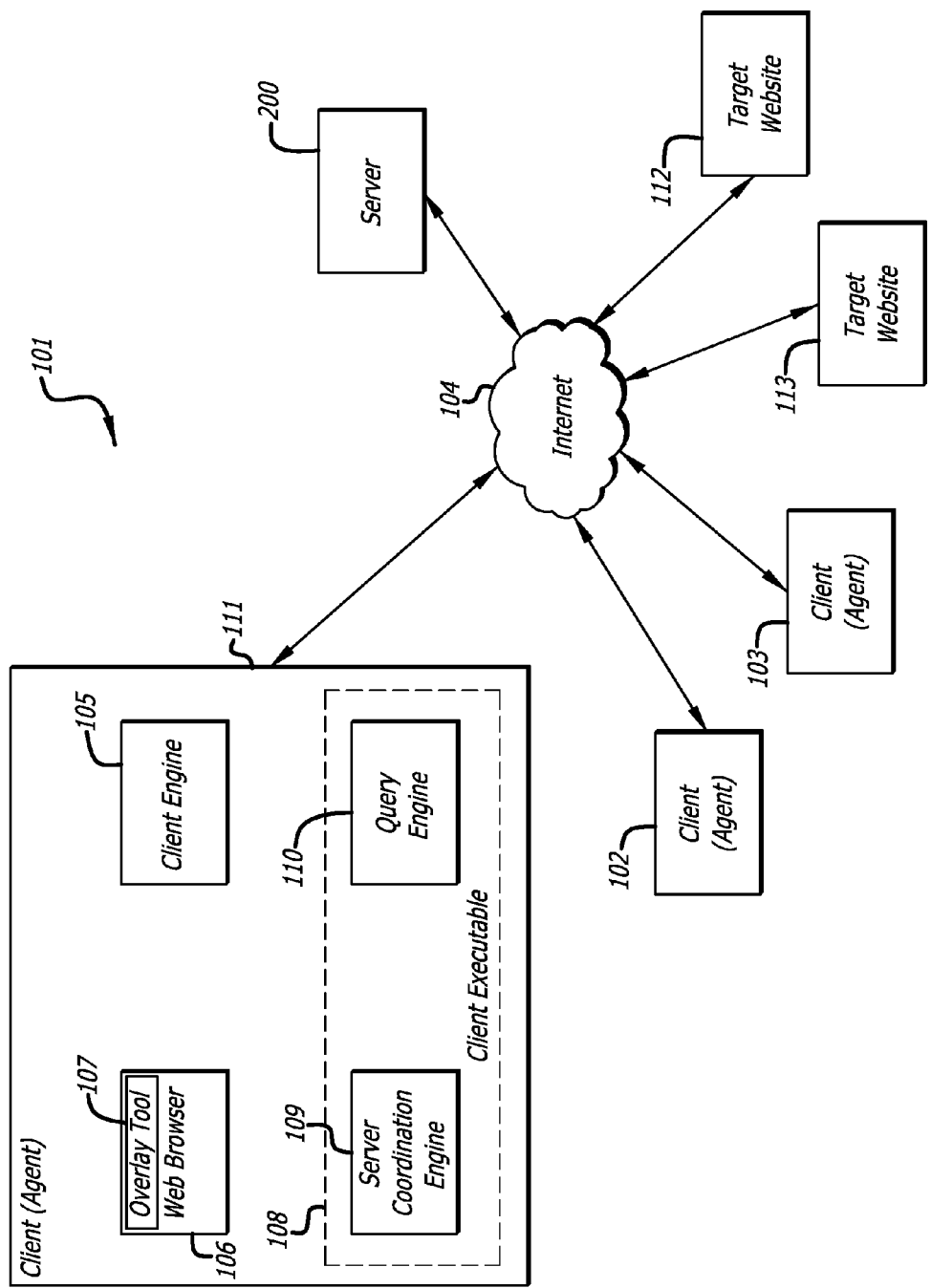
FIG. 2 is a block diagram illustrating an exemplary embodiment of a client in a distributed network.

FIG. 2 is a block diagram illustrating an exemplary embodiment of a client located in a distributed network in accordance with the present invention. Shown are clients 101, 102, 103 (also referred to as agents), server 200, target websites 112, 113, and the Internet 104. Client 101 includes a client engine 105, web browser 106 with browser overlay tool 107, and server coordination engine 109 and query engine 110 (referred to collectively as client executable 108). Note that, while in this illustration the agents communicate with a target website over Internet 104, a different type of network may be equally suitable depending on the particular application.

Client engine 105 provides processing power for the client device and handles coordination between different applications and engines. Web browser 106 may be a conventional web browser (such as Internet Explorer, Firefox, Netscape, Mozilla, Opera, etc.), a customized web browser for a cell phone, BlackBerry, PDA, or other web interface device. The overlay tool 107 may be a toolbar, such as a toolbar built as a browser helper object for Internet Explorer. Overlay tool 107 extends the functionality of web browser 106 by selectively adding content to a received web page based on a set of overlay rules. In one embodiment, these overlay rules specify that for a given results page (e.g., a results page from an online travel agency), additional content is to be inserted into the output. For example, if a user is searching for flights on Expedia, and the result list that is returned includes ten different flights, the web page may be modified such that the web page that the user sees includes additional content not provided by Expedia. This additional content may include a "buy direct" hyperlink that enables a user to purchase a ticket directly from an airline, and a "track this flight" hyperlink that enables a user to track a flight (e.g., causes a new tracking rule to be created in tracking engine 204). The process of creating overlay rules and manipulating rendered content is described in greater detail with respect to FIG. 5.

Client executable 108 is in one configuration an executable that runs as a process on a client machine (e.g., the client automatically loads the process on start-up without requiring user interaction). In one embodiment, the two components of client executable 108 are server coordination engine 109 and query engine 110. Server coordination engine 109 handles communications of tasks from and results to the client coordination engine 203. The tasks may be, for example, tasks to repeatedly query a travel website for a particular flight until the client coordination engine 203 tells the executable to stop. The task may include a priority, such that if the executable is tasked with several queries, the executable can be directed to conduct a particular task first.

Communications may be initiated by the client executable 108, by the client coordination engine 203, or both. Communications to the client coordination engine 203 may be handled as soon as they are available (e.g., to support a real-time request from a user interacting with web engine 202) or aggregated to limit network traffic or to accommodate communication problems (e.g., updates are aggregated and sent as a group by the server coordination engine 109 and sent to the client coordination engine 203 periodically). Whether a report is sent immediately or aggregated may be dictated based on the initial tasking (e.g., the task may include an immediate response attribute). The actual communication may be by any conventional protocol, including an HTTP request from the server coordination engine 109 to the web engine 202 that can provide the information to the client coordination engine 203.

Query engine 110 executes received tasks based on their priority and in accordance with system and user settings. For example, a system or user setting may specify that there must be five minutes between queries, or query only when client engine 105 is idle, so that a client machine is not burdened by excessive query traffic. In one embodiment, query engine 110 may conduct queries on behalf of multiple clients or users (e.g., not just a user associated with client 101). Additionally, when query engine 110 visits a website, it may provide a user agent signature similar to the web browser 106 on client 101, such that the target websites 112, 113 receive the same user agent signature whether web browser 106 or query engine 110 initiates the request.

Server coordination engine 109 and query engine 110 may communicate via a shared file or files. For example, when query engine 110 receives results from a query, these results may be written to an eXtensible Markup Language (XML) file that the server coordination engine 109 uses to communicate to the server system 200. Similarly, the overlay tool may write to a shared XML file when a user clicks on a "track this flight" hyperlink and the server coordination engine 109 may use this file to cause a new tracking rule to be created in the tracking engine.

Figure 3:
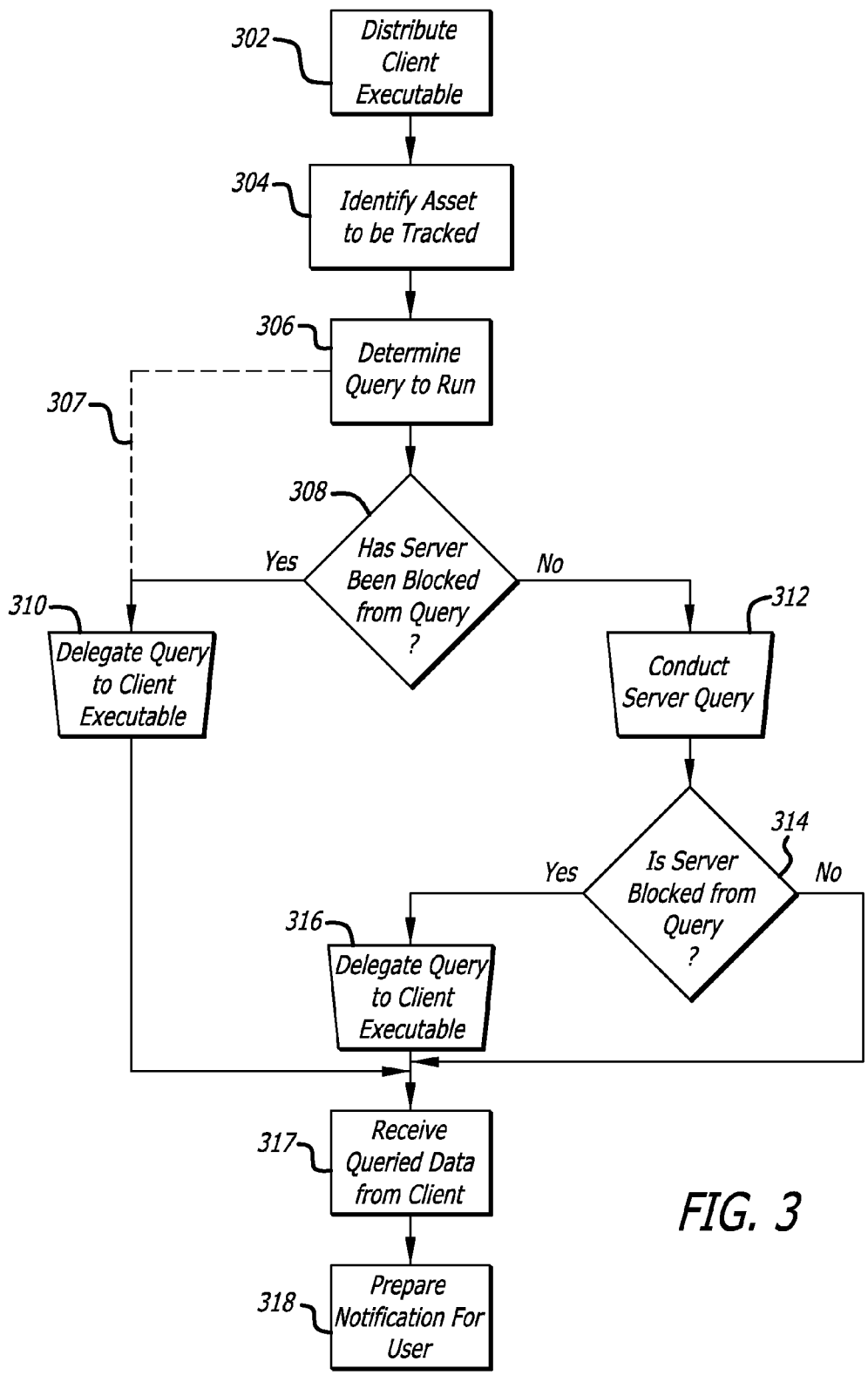
FIG. 3 is a flow diagram of an exemplary method for conducting a distributed search.

FIG. 3 is a flow diagram of a method for conducting a distributed search in accordance with the present invention. This method includes, in step 302, distributing client executables to a plurality of distributed clients (e.g., clients 101, 102, and 103 in FIGS. 1 and 2). This may be accomplished by allowing users to download software from a website, mailing media to a user, bundling the software with other applications, or by other means. In one embodiment, a user of a client may access the Internet to download the executable from a website associated with the server system 200 (FIG. 1).

Next, the user identifies one or more assets to be tracked (step 304). That information is conveyed to the server 200, for example, via the server coordination engine 109 (FIG. 2). Determining a query to be run based on the assets to be tracked (step 306) may involve identifying active tracking rules in the tracking engine and the amount of time since an asset was last checked. In some embodiments, the server 200 simply delivers a request for the client 101 to execute the query. The client executable is these cases is configured to formulate the query, or alternatively to download or receive the query from a user or external source. In other embodiments, as in step 306, the server formulates the query, in this case based on tracking rules, elapsed time since the last search, or similar criteria. In some situations it is advantageous to formulate the query at the server end, to minimize the burden on client resources. In general, the actual formulation of the query may be performed at either the client or server end without departing from the scope of the present disclosure.

Because some websites may not allow automated queries as described above, server 200 may store information about which target websites may prevent server 200 from successfully completing a query of the target website. If the server 200 has been blocked before (decision branch 308) the server system may automatically delegate the query to one or more available client executables (step 310). If the server 200 has not yet been blocked, the server 200 may attempt to query the target website directly (step 312). Querying a website regarding a target asset by a server system may involve a scraping application to request information from the target website for information relating to a target asset. If the query is not successful (decision branch 314) (e.g., the target website fails to respond to the request or responds with information that is different than the information that is delivered to a browser), the system may delegate the query to one or more available client executables 316. Thereupon, after the client executes the query at the target node, the client may send or return the requested data obtained from the query to the server (step 317). The data obtained from the client may be deposited by the server in a central database for future use by the client that ran the query or by other clients in the distributed network. Preparing notification for the user (step 318) may be implemented in accordance with system settings, user settings, tracking rules, or settings for a particular target asset.

In another embodiment, the server system 200 may be set up to immediately delegate the query to one or more available client executables (step 310). This alternative embodiment is illustrated by the dashed line 307 connected to the line extending to step 310, substituting the decision path relevant to a possible server query for a straight delegation instead. The client executable that is the subject of step 316 may be the same client that identified the target asset and target node in the first place. Alternatively, where that client is unavailable, busy, idle or otherwise nonresponsive, the server may delegate the search to another client executable to perform. The latter then will return the results of the search to the server as in step 317. In this embodiment, the tracking or data acquisition process may continue unimpeded even if a requesting client's resources are unavailable or being used for other applications.

Using the principles described above, a data scraping program is able to access a target website even if the website is running a standard blocking program to block data scraping. Because the actual queries for data are being conducted at agent machines instead of the server 200 itself, the blocking program is unlikely to block access to the target website for the reasons described above. Further, unlike a server running a scraping program that potentially seeks voluminous amounts of data, each agent in one embodiment conducts queries for a relatively small amount of data in comparison. Accordingly, the agents are unlikely to be flagged and blocked by the target website as exceeding a volume threshold at the website. After the data is obtained from the target website by each agent to which tasks are delegated, the resulting data can easily be streamlined and centralized by the server 200 in a database for subsequent use.

In another embodiment, the search by the client may be tailored to have substantially the same characteristics as a search performed in real time by an individual. For example, the search can be made to appear random to the target website in the same way a user may send ostensibly random queries to the website.

Figure 4:
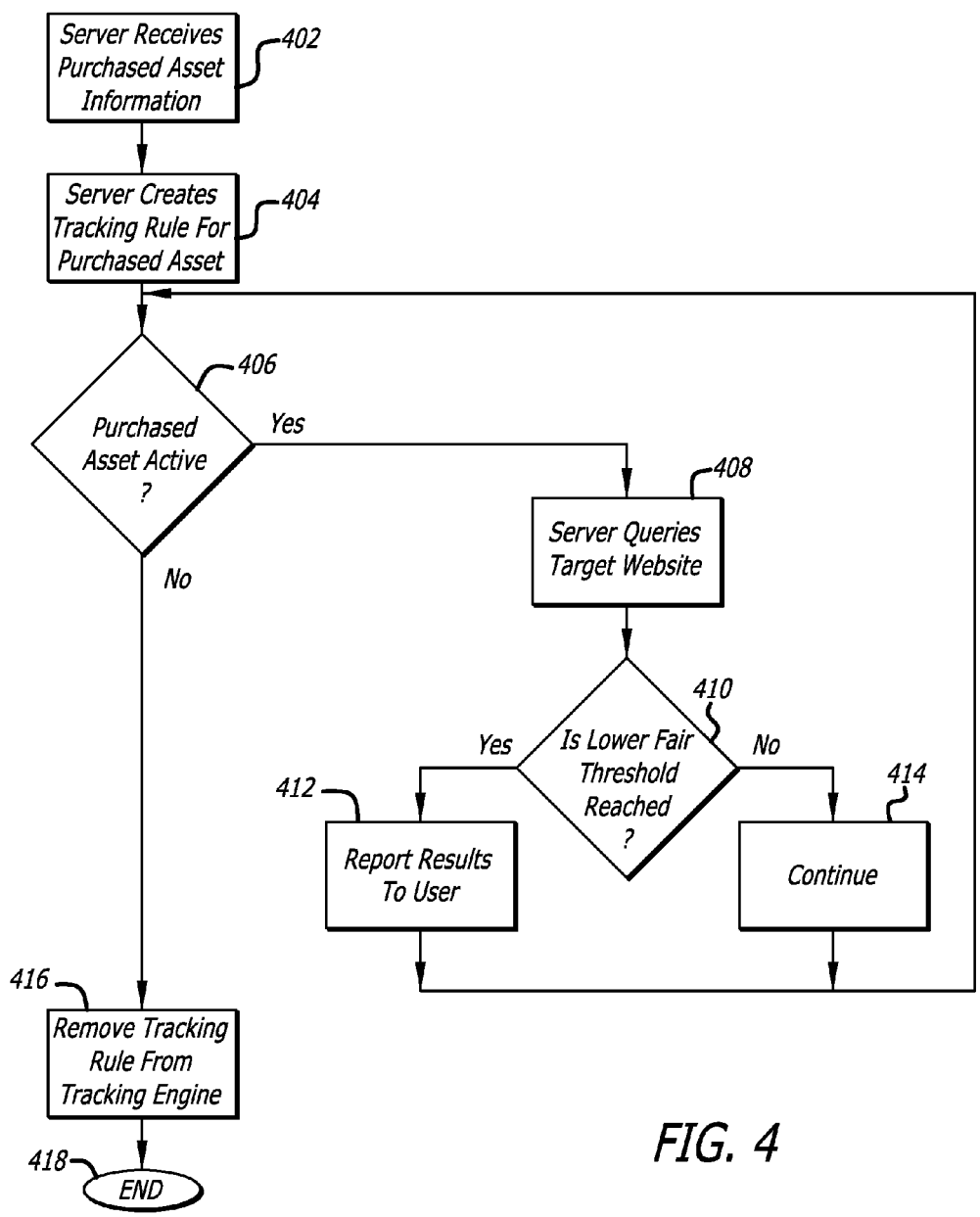
FIG. 4 is a flow diagram of a method for conducting a search for a refund.

FIG. 4 is a flow diagram of a method for conducting a search for a refund in accordance with the present invention. Receiving a set of information at the server relating to a purchased asset from a user (step 402) may involve receiving an airline and a confirmation code, for example, which may be used to determine a variety of asset attributes, including arrival and departure cities, dates, and times, and a purchase price. This information may be stored in refund engine 206 (FIG. 1). Based on the arrival and departure cities, dates, and times, a tracking rule may also be created and stored in the tracking engine 204 (step 404). The tracking rule(s) may delineate criteria for tracking, such as how frequently a follow-up query should be done, at what locations (e.g., websites or databases) the query should be performed, the circumstances under which tracking should continue or terminate, and the like. The tracking rules may also identify whether a user is entitled to some type of benefit.

For example, a prospective purchaser using a client machine to track the price of a target asset may, under the guidelines of the target website or as provided by law, become entitled to a discount. The user's entitlement to a discount may arise, for example, if the price of the target asset drops below a certain amount. Likewise, a user of the machine who already purchased the target asset may under certain conditions be entitled to a partial or full refund as a result of the price of the asset dropping below a specified threshold. In either case, the criteria for the benefit and an identity of an action authorized in the event of a change in price or other contingency can be stored as a set of tracking rules along with the other types of more typical tracking criteria referenced above.

The tracking then proceeds over time based on the criteria set forth in the tracking rules. Periodically or at designated times, the price of the asset is checked as long as the purchased asset is active (decision branch 406 and step 408). For example, as long as the date of a flight for a purchased airplane ticket has not passed, or the user or the system has not deleted or disabled a tracking rule, the system will continue to determine whether a refund is available (steps 410 and 414). This tracking rule may lead to the server periodically checking the price of a flight (step 408), the server delegating a task to one or more client executables to check the price of a flight (depicted in FIG. 3), or other action. If a lower fair threshold is reached (decision branch 410) based on the threshold preferences associated with the tracking rule, the user will be notified (step 412) in accordance with the user's notification settings. Where the lower fair threshold indicates, based on a rule from a vendor or other criteria, that some action (e.g., issuing a refund) is authorized, then the notification in step 412 may include a notification to the user, a request for the user to confirm that the server 200 can process the refund, or both.

Where it is determined that the purchased asset is no longer active as described above, the server will remove the tracking rule(s) associated with the purchase of that asset from the tracking engine 204 and the tracking process of this example is complete (steps 416 and 418).

In one embodiment, the refund may be handled automatically (e.g., where the user receives a refund if a refund becomes available without user activity), semi-automatically (e.g., where the user is presented with the option of collecting a refund and, if the user elects to collect the refund, the system handles the collection of the refund), or by other means. The billing for this service may be implemented on a flat-fee basis, a percentage of savings basis, a percentage of price of the total asset, or by other criteria depending on the nature of the service.

In another embodiment, the tracking rules may include a rule obtained from the vendor of a product or service. Such a rule may include, for example, a set of criteria for determining whether a particular action is warranted—e.g., whether purchaser of the good or service is entitled to a refund, whether a store credit becomes available, etc. When a change in the price occurs, the server may compare the change in the price (e.g., the new low price or the amount of the change, or both) with the rule. In the case of a refund, if a rule is met, the server may issue a notification to a user identifying that a refund is available (step 412), or handle the refund automatically or semi-automatically as described above.

Rules from the vendor may be obtained from the server by the vendor, from the client, or through other means. The rules may also originate from a vendor of the asset at issue, but may be received by the server 200 as a result of a request to a client machine to execute one or more appropriate queries at the vendor's web site. Alternatively, the server 200 may execute the query. In addition, the operators of server 200 may provide these rules to the server in advance, based on, for example, provisions of law, website or vendor guidelines, or rules of purchase of various assets from the vendor or other target asset provider. Thereupon, either the server 200, the operators, or another system or third party can monitor the sources of the rules for any applicable changes and the rules in the server can be updated as necessary.

In one embodiment, a user's entitlement to a benefit like a refund (for an asset already purchased) or a discounted price (for an asset for prospective purchase) is determined by the rules at the server, so that the user is relieved from having to directly engage in the often complicated endeavor of figuring out his or her entitlement, if any, to such benefits. In addition, the computing resources required for making such determinations may be kept in this embodiment at the server 200 to avoid burdening the client machine from having to perform computations relating to this inquiry.

Figure 5:
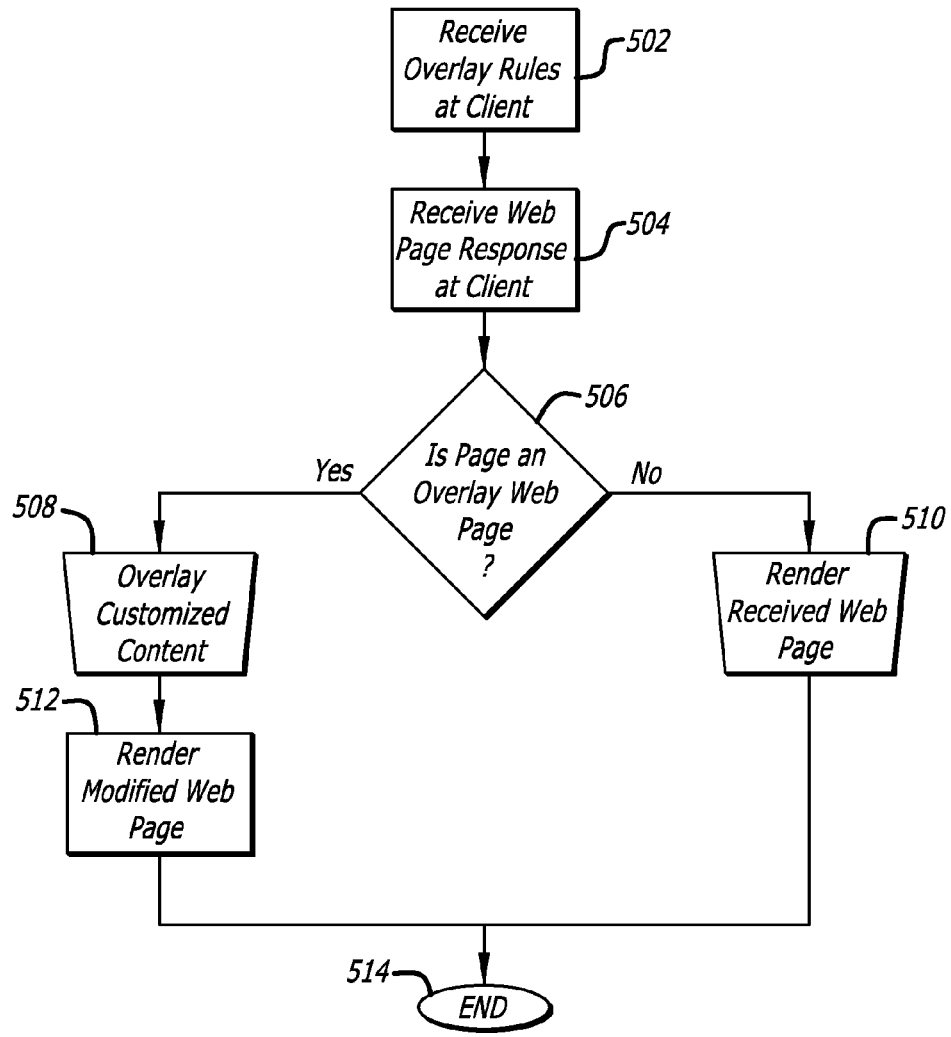
FIG. 5 is a flow diagram of a method for rendering an improved results page that, in one embodiment, involves overlaying content onto a web page.

FIG. 5 is a flow diagram of a method for rendering an improved results page that, in one embodiment, involves overlaying content onto travel-related web pages. Receiving a set of overlay rules at a client (step 502) involves first analyzing the results returned by a target website and determining patterns that may be used to overlay content on particular web pages. For example, if a search is conducted on an online travel agency website, a results page may be returned. This web page may have a particular HyperText Markup Language (HTML) pattern, such as a first table having navigation information (e.g., queried flight times and dates) and a second table having a number of different flight results. A rule may be created that identifies each of the matching flights by traversing the document object model, regular expression matching, or any number of other techniques for recognizing data values embedded in patterns in web pages or other electronically-rendered documents. These rules may then be encoded and distributed to client machines having software configured to implement the overlay rules (e.g., overlay tool 107). Thus, an exemplary software application customized for distribution to client machines may include a list of web sites or network locations in which overlay can be performed according to the principles herein.

Receiving a web page response at the client (step 504) involves a user visiting the network location or target website (e.g., the online travel agency website) and conducting a search. Although the flight information may be different, the returned results page may have a format matching an overlay rule. A determination as to whether the web page or rendered document may be overlaid is made (decision branch 506). This determination of whether a page may be overlaid may be made based on some or all of the URL of the requested page, the document object model of the page, a combination thereof, or other criteria. If it is determined that the page may be overlaid based on one of the overlay rules, the content is modified (step 508) and the modified web page is rendered (step 510). For example, if it is determined, based on the domain or the response and the document object model of the HTML page, that one or more flights has been returned, an overlay tool 107 or other process or application may manipulate the rendered web page by adding one or more additional controls to each of the returned flights. If the web page is not an overlay web page, then the server will not modify the content of the web page and the web page may instead be rendered as it was received (step 510). The overlay cycle has thus been performed (514).

Figure 6:
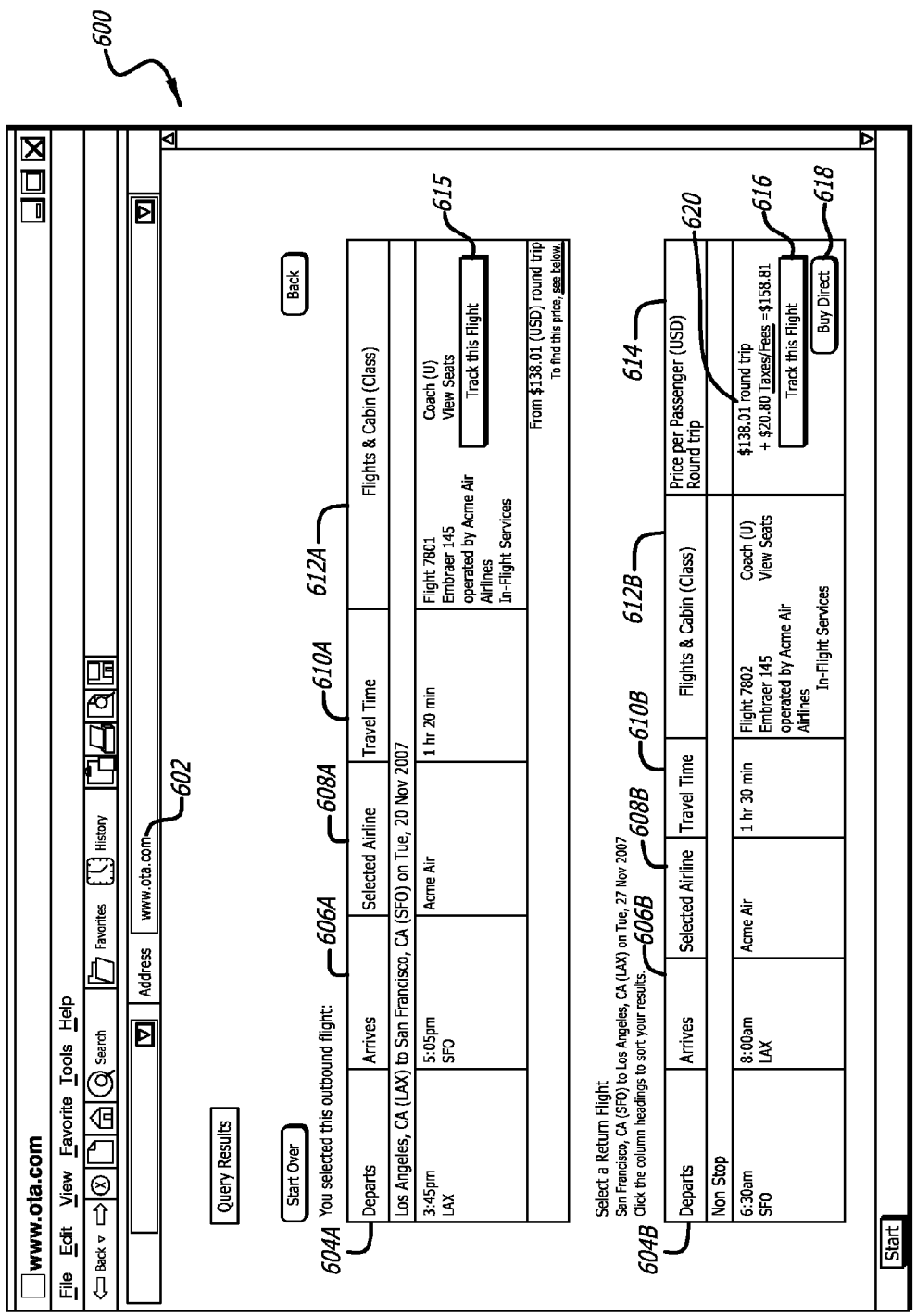
FIG. 6 is an illustration of a web page from a fictitious travel website overlaid with content.

FIG. 6 shows an illustration of a website of a fictitious travel agency overlaid with content. The web page is a "results" web page in this example. That is, the web page includes a list of search results displayed in response to a user query. In particular, a user visits the home page of the fictitious agency and executes a query for round-trip flights on particular days (here, Nov. 20, 2007 and Nov. 27, 2007, respectively) on a specified airline (i.e. Acme Air). The website may respond by returning a list of available departure flights and return flights on the identified airline on the identified dates (not shown). Thereupon, the user selects a particular departure flight and a particular return flight. The web page shown in FIG. 6 displays the results of the user's selection of these two flights. This exemplary web page also shows departure city (604), arrival city (606), airline (608), travel time (610), cabin class (612), and round trip price (614).

In this example, the overlay tool 107 may provide two extra user controls for the first flight (only "track this flight" 615 is shown) and two additional controls 616 and 618 for the second flight. The "buy direct" flight in this example is only shown in the return flight field, because this control may contemplate that the user desires a single purchase for the entire round trip ticket. However, other types of controls or configurations may be equally suitable. As noted above, in the example of FIG. 6, the overlay tool 107 provides two user controls near the data field (620) under the price column (614). Each of the additional controls will be uniquely assigned to the return flight, such that clicking on "track this flight" (616) for the first flight will cause the return flight to be tracked and will not cause the outbound flight to be tracked. In one embodiment, clicking a "buy direct" (618) control from the online travel agency will cause a web page to be rendered that is in a different domain than the domain of the online travel agency (e.g., www.OTA.com is the domain of the online travel agency and www.airline.com is the domain of the airline). These controls are placed near the data values with which they are associated (in this example, the results of the query) so that the user can readily identify the controls and select them as necessary. Thus, in the example of FIG. 6, the user controls 616 and 618 are substantially adjacent the price of $138.01 such that a user is advantageously more likely to associate the user controls with the corresponding price and the return flight than if the user controls were not placed near the price (but rather, for example, were placed on the top of the page above the list of results and could not reasonably be visually associated with a specific result).

Figure 7:
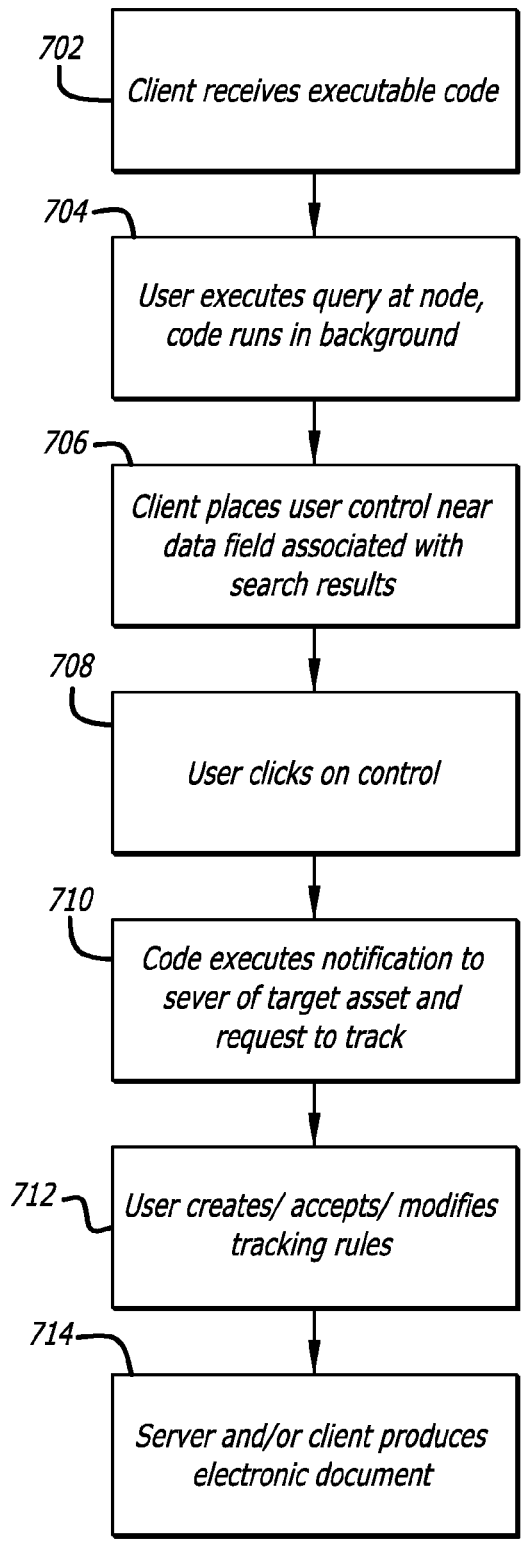
FIG. 7 is a flow diagram of a method for initiating and performing tracking as a result of a selection of a user control.

In another embodiment, a user's selection of or clicking on the user controls placed by the client executable will initiate the tracking process described above with respect to FIG. 4. This embodiment is shown in FIG. 7. At step 702, the client receives a body of executable code as discussed with respect to previous embodiments. This executable code may be configured to communicate with the server. That is, the code may be used to coordinate tasks with the server to accomplish one or more of the objectives set forth in this disclosure. The code in one embodiment may include a software application or suite configured to enable a client in a distributed network to track a different types of data searches executed at a node, such as a website or a remote file server. The code may also be configured to monitor a user's searches (upon the user's authorization) and transmit applicable data obtained from searches to the server 200 for processing (e.g., the identification of an asset or a node, or both).

At step 704 the user executes a query for data at a desired node. Meanwhile, the client executable runs in the background and is alerted to user actions which authorize the client executable to perform corresponding actions. Step 704 may be accomplished when a user is searching web pages in a web browser. The code may monitor the searches, and may also prompt the user with a request, in the web browser or separately, to enable tracking features or placement of user controls. Thereupon, the user may click on the request. In other embodiments, the tracking features are automatic and no further user action is required to initiate them.

When the user has obtained a search result, the client executable places one or more user controls strategically positioned near one or more data fields associated with the search results. Illustrative user controls are depicted in FIG. 6 above. If, for example, the data value represents the price of a stock, a control such as "track this stock price" may be placed adjacent the data value for the user to readily perceive. The user control may comprise, for example, a hyperlink, upon which actuation by the user notifies the client executable to track the value in the applicable data field.

In step 708, the user actuates the control by selecting or clicking on the link. At which point, the client executable is prompted to deliver a message notifying the server of the asset (in this case the stock price), along with a request to track the asset (step 710). Thereupon, the normal tracking procedures are commenced by the server, such as those illustrated in FIG. 4. Further, the user may elect to create, accept or modify tracking rules already stored or to be stored on the server 200 in any number of ways depending on the capabilities of the client executable and the server, such as identifying one or more nodes to track the asset, notify threshold values required for the server to notify the client of any change, identify a frequency to track the asset or to notify the client, etc. (step 712). In one embodiment, these activities are automated by the server as a set of default activities, which a user may adjust or delete, as appropriate, through an interface provided by the overlay tool 107 (FIG. 2).

At step 714, during the course of tracking an asset, the client and/or server may collaborate to provide a summary of tracking results or other data on an electronic document such as a web page. The user can then download the appropriate web page and view the results or updates, obtain a refund, or make adjustments to preferences and the like. In other embodiments the client executable is responsible for generating an accessible electronic document without further server intervention. Alternatively, the tracking results or summary may also be provided in a field of the overlay tool 107, an e-mail, or other suitable means.

As stated above, in a preferred embodiment, users may modify the overlay behavior by adjusting their preferences. For example, a user may elect to suppress overlay behavior on a particular page, for a particular site, or otherwise change the way in which the overlay tool operates. This modification may be implemented via the web engine 202, the overlay tool 107, or by other means. Furthermore, the content being provided may be modified based on tracking rules. For example, if a user is currently tracking a flight, and the user conducts a search that returns the flight being tracked, the overlay tool may not provide the "track this flight" control, and may provide another control in its place (e.g., "stop tracking this flight" or "change your tracking preferences"). These preferences may be stored on the client computer or, alternatively may be uploaded to the server for storage and control.

Figure 8:
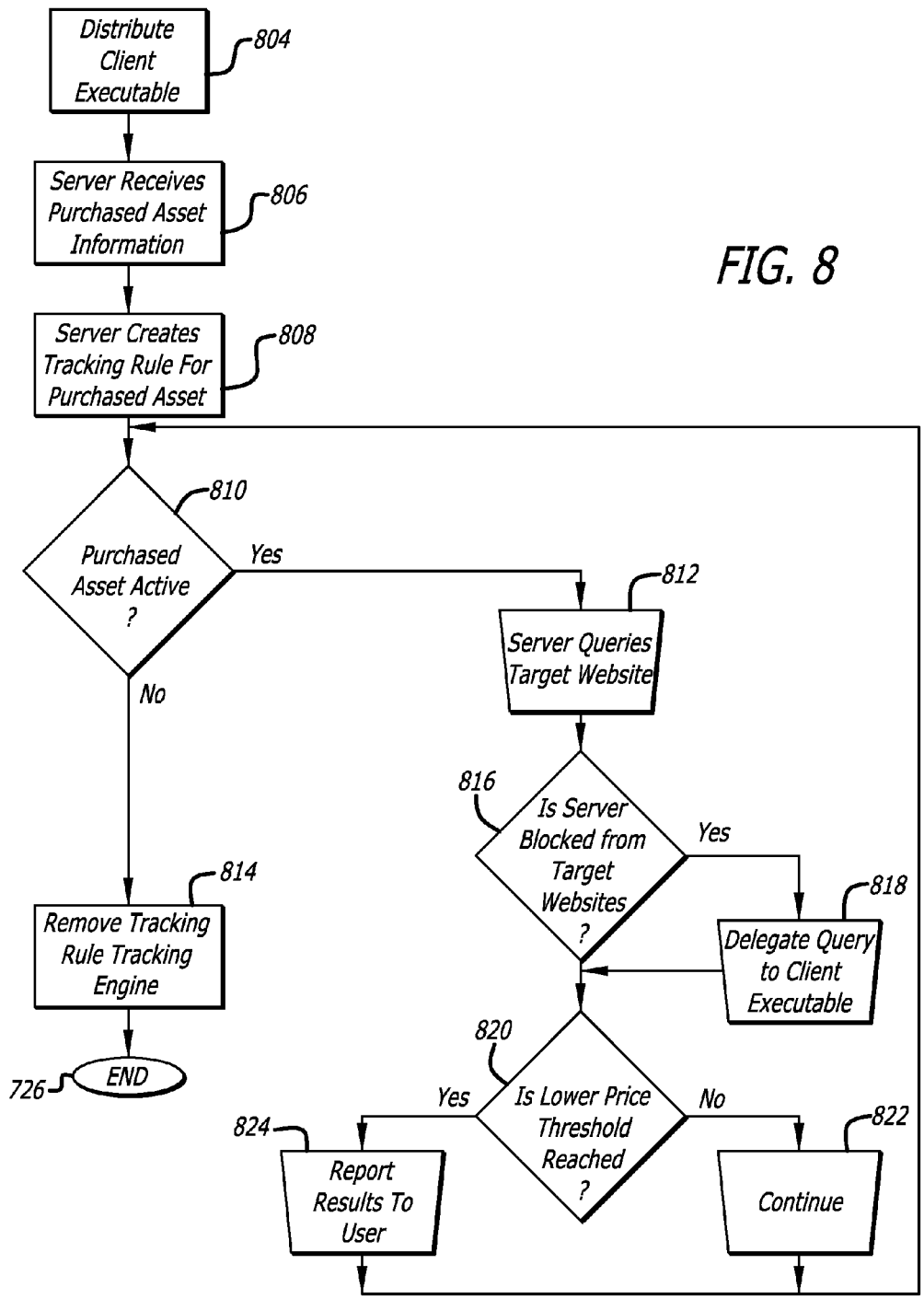
FIG. 8 is a flow diagram of an exemplary method for conducting a distributed search for a refund.

FIG. 8 is a flow diagram of a method for conducting a distributed search for a refund. This method is a combination of the methods described with respect to FIGS. 3 and 4. A user receives application software in the form of executable code. The software may be distributed by the server via as a file or files via a download (step 804). Alternatively, the software may reside on a CD, DVD, or it may be obtained from another web site or network location. Using the software, the client enables the server to receive information about an asset that was purchased (step 806). For instance, if a user purchased a flight on a travel website, the software may enable the client to communicate information regarding this purchase to the server. At this point, based on information transmitted by the client (such as, for example, desired price decrements required for client notification, etc.), the server creates one or more tracking rules for the identified asset (step 808). The server 200 may store the tracking rules in the tracking engine 204 (FIG. 1) as described above.

At decision branch 810, the server inquires whether the purchased asset remains active (e.g., whether a refund is still possible, whether the flight has already occurred, and similar types of criteria). If the asset is no longer active, the server 200 removes the tracking rule from the tracking engine 204, and the exemplary process has completed (814 and 826). If the purchase asset remains active, the server may attempt to conduct the query as in previous embodiments (step 812). If the query is blocked by the target websites (branch 816), then the server 200 may delegate the query to one or more client executables (step 818). After the query is run by either the server or the client, a comparison between the new price (if any) and a user-imposed threshold is made (branch 820). If the price has dropped below the threshold, the entitlement to a refund (if available) is reported to the user (step 824). If not, step 810 through 824 repeat until the purchased asset is no longer active.

As noted above, in one embodiment the server may not perform the query, but may automatically delegate it. This technique is advantageous in situations where automated searches are often blocked by the applicable target nodes as described earlier in this disclosure. In this situation, the agent (client) computers in the distributed network may perform the searches and return the results to the server. In still other configurations, the server may delegate a search requested by one client to another, such that when the requesting client is busy, idle, or otherwise nonresponsive, another available client in the distributed network can perform the search.

Figure 9:
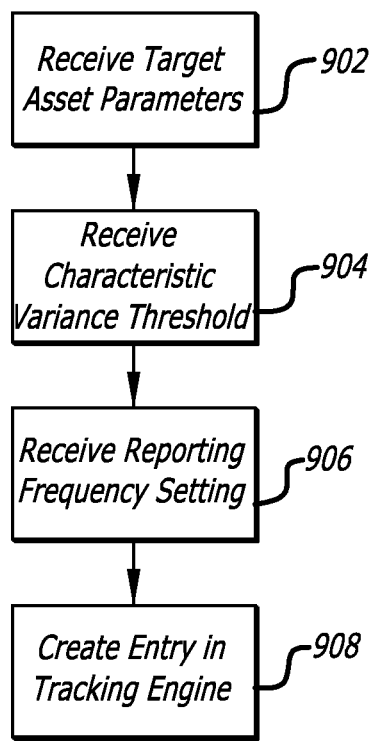
FIG. 9 is a flow diagram of an exemplary method for creating a tracking rule based.

FIG. 9 is a flow diagram of a method for identifying a target to be tracked. In one embodiment, the target asset parameters are received (step 902) at the server 200, such as a flight number, flight dates and times, and departure and arrival cities. Ranges may be provided, for example, for the flight dates if the user's schedule is flexible. This information may be provided in various ways. One way is through the client executable. For example, a user may authorize the client executable to store this information upon the user selecting a link as discussed above with reference to FIG. 7.

At step 904, characteristic variance thresholds are received, such as the price variance that occurs before the system notifies the user. For example, the user may select that notifications will be generated only for changes greater than $25. Reporting frequency may be determined at step 906, and a user may select to receive notifications once a threshold is met (e.g., immediately), once per day, twice per week, etc.

Once the server has this information, it may create a tracking rule in the tracking engine 204 (step 908), which may then lead to tasks delegated to a plurality of the client executables as previously described. In one embodiment, each new tracking rule is provided with a default set of characteristics (e.g., reporting frequency and price threshold), but the user may override these default settings either globally (e.g., change it so that all tracking rules created in the future will take this new setting) or just for a particular asset (e.g., change the settings for one tracked asset, but new tracked assets will be provided with the system default).

Figure 10:
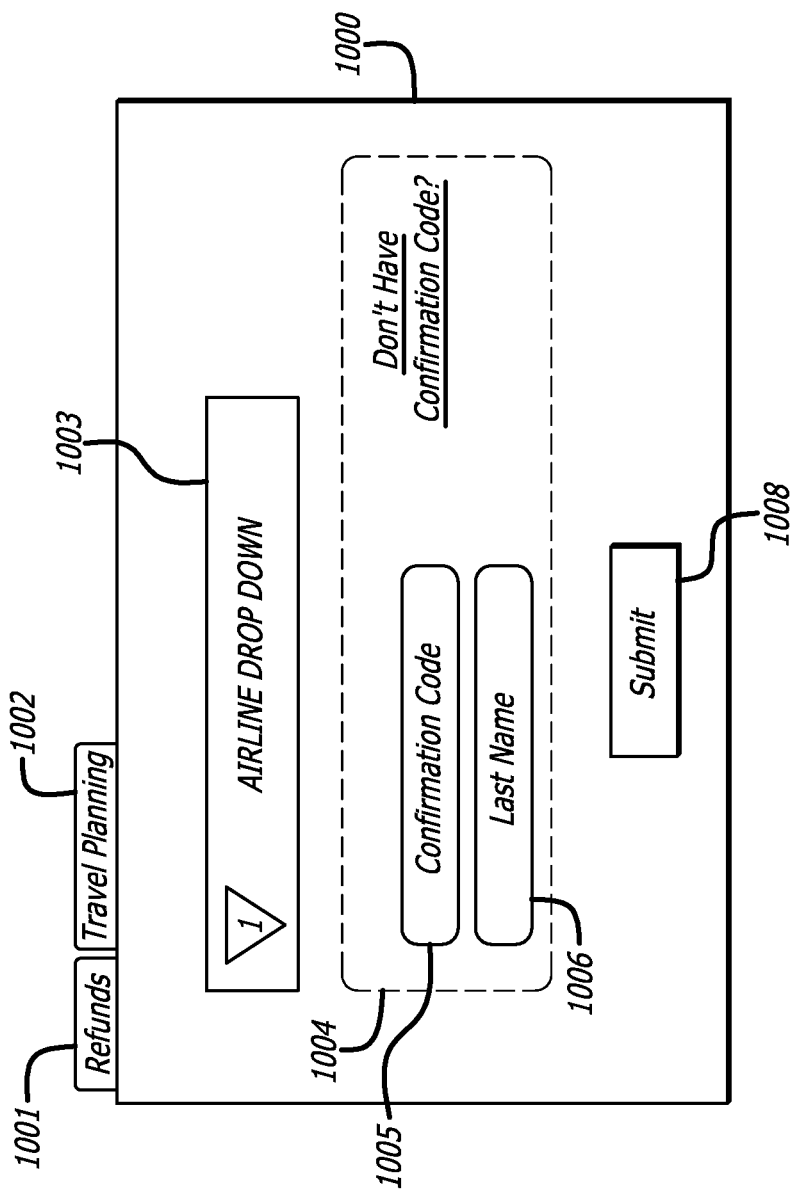
FIG. 10 is an exemplary graphical user interface (GUI) for configuring a client account.

FIG. 10 is an exemplary graphical user interface (GUI) for configuring a client account 1000. This GUI is generated by web engine 202 (FIG. 1) and may be rendered by web browser 106 or other application. Refunds tab 1001 is used for tracking rebates on assets already purchased, while travel planning tab 1002 is used for tracking assets that have not been purchased. The airline dropdown 1003 may be presented to a user first, because the information presented in panel 1004 may be dependant on the airline selected. For example, some airlines may have different information that is required prior to being able to track a flight such that confirmation code 1005 and last name 1006 may be sufficient on one airline, but another airline may require a user to provide departure and arrival date, time, and city (and purchase price for refunds). Hitting the submit button 1008 causes a request to be initiated that is handled by web engine 202 (FIG. 1).

In one embodiment, a travel profile may be compiled for each of the users, including frequent flier numbers, travel preferences, previous flights, etc. In this way, the system may continue to provide the user with more relevant information and less irrelevant information without requiring the user to manually update his or her preferences explicitly.

In another embodiment, a user may be provided with customized advertisements based on travel information that a user is tracking. For example, in a notification that a fare has been changed for a particular flight, the user may also be informed of availability and pricing for a nearby hotel.

Figure 11:
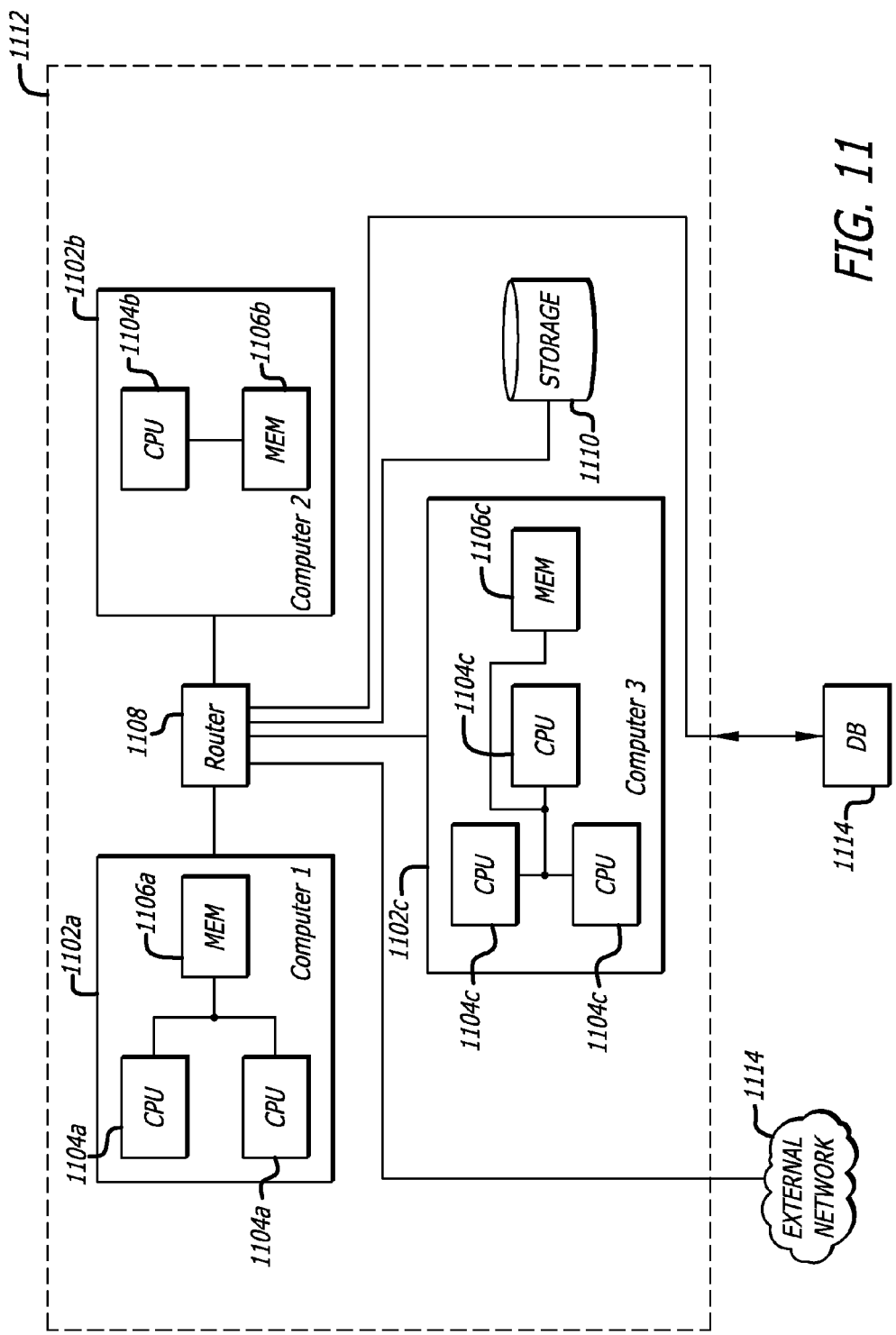
FIG. 11 is a block diagram of an exemplary embodiment of components of a computing system in accordance with the invention.

FIG. 11 shows a block diagram of a computing system used to implement the server functionality in accordance with an embodiment of the present disclosure. The computing system 1112 in this illustration includes COMPUTER1 1102a, COMPUTER2 1102b, and COMPUTER3 1102c. The three computers 1102a, 1102b and 1102c are networked together through a router 1108 or other network hardware device. While a networked connection is shown here, this configuration is not crucial to the disclosure and the computers 1102 may be connected through any conventional means. The networked connection is shown to emphasize that the computers may, but need not necessarily, be in the same location. Each computer 1102a, 1102b, and 1102c includes one or more central processing units (1104a, 1104b, and 1104c, respectively) and memories (1106a, 1106b, and 1106c, respectively). The central processing units 904 are collectively referenced as a processing system, and may as here include one or more processors. Likewise, the memories 1106 are collectively referenced as a memory system.

In addition, computing system 1112 includes a storage 1110 (e.g., one or more hard drives) for storing data or code obtained from or used by computers 1102a, 1102b, or 1103c or from another source via external network 1114, also coupled to the router. The storage 1110 may, for example, include the client executable for distribution to clients over the external network 1114. A database 1114 is also coupled to router 1108 and may used by the computing system as a central repository to store data obtained from tasks performed by a plurality of distributed agents in network 1114. In one embodiment, database 1114 is a high capacity, high speed networked array of disk drives.

The processing system 1104 is coupled to the memory system 1106 in the sense that information in one of the memories 1106*a-c* may store data that can be used by or in conjunction with one or more of the central processing units 1104*a-c*. The use of the word "coupling" in this disclosure does not require a direct connection between any given central processing unit and memory. Nor does the use of word "coupling" require that a particular central processing unit must be on the same machine or network as a particular memory.

For purposes of this disclosure, the software and applications run by the processing system 1104 of FIG. 11 and the server 200 of FIG. 1 is also referred to as executable code, server executable code or server code. Similarly, the software or executables run by one or more of the client machines 101, 102, and 103 (FIGS. 1 and 2) is also referred to as executable code, client code, or client executable code. For purposes of this disclosure, the processing system need not be limited to what is referred to as central processing units, but may embody any number of alternative types of processing circuits, whether digital or analog and whether dedicated or general purpose, etc. Likewise, the memory system may comprise any number of topologies such as a random access memory, read only memory, programmable memory, flash memory, hard disk drive, optical drive, etc.

For purposes of this disclosure, the computing system may comprise one or more computers. They may incorporate any of a variety of commonly employed physical and functional server architectures. The computers within the system 1112 need not be in the same physical location and may communicate using one or more wired or wireless network connections. Each computer may be dedicated to a single task or function, or alternatively, the computers may split the resources of a plurality of functions. Each computer in the system 1112 may include its own storage, or rely on a central or remote storage repository. In some embodiments storage 1110 is not necessary.

The server executable code may likewise be resident on a single computer 1102, or it may be run on a plurality of computers. Similarly, the server code may be configured to run on one or more CPUs. The memory system contained in computer system 1112 may include a single memory 1106, or it may include a plurality of memories associated with the same machine or with different machines.

The database 1114 may be physically realized as a central repository or the database may be physically distributed over a plurality of locations. The database 1114 may, for example, be configured as a Storage Area Network, or one or more RAID arrays.

The machines described herein may be implemented using software, hardware, or a combination of both. By way of example, the server or agent machines may be implemented with one or more integrated circuits (IC), either alone or in common with other processing functions (e.g., a data processor, etc.). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. The machines may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include one or more electronic files, including a set of executable code in whatever format. For example, files comprising a software application downloaded from the Internet constitute a machine-readable media. Machine-readable media may also include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the searcher 304. Moreover, in some aspects any suitable computer-program product may comprise a computer-readable medium or machine-readable medium comprising codes relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, "step for".

What is claimed is:

1. A client computer system comprising:
   a client data storage device containing executable computer code;
   a client display; and
   a client processing system associated with the data storage device and the display and configured to run the executable computer code, the executable computer code having a configuration when run that causes the computer system to:
   receive a web page from a web page server;
   automatically determine by applying a set of rules whether the received web page contains a data field with a price that may change as a function of time;

in the event that the web page is automatically determined to contain a data field with a price that may change as a function of time:
  display the received web page on the display with a visible user control that was not part of the received web page overlaid on the web page near the data field with the price that may change as a function of time; and
  in response to actuation of the visible user control by a user of the client computer system, issue a command that causes the price to be tracked as a function of time;
in the event that the web page is automatically determined not to contain a data field with a price that may change as a function of time, display the received web page on the display without the visible user control overlaid anywhere on the received web page.

2. The client computer system of claim 1 wherein the tracking comprises:
  executing, after the actuation by a user, a query for an updated version of the web page from the web page server;
  identifying a new price in the data field; and
  storing the new price in a database.

3. The client computer system of claim 1 wherein the received web page has an address and one of the rules has a configuration that determines whether the received web page contains the data field with a price that may change as a function of time based on the address of the web page.

4. The client computer system of claim 1 wherein the user control is a first user control and the executable computer code has a configuration when run that causes the client computer system to cause a second visible user control to be overlaid on the received web page instead of and that is different from the first user control in response to actuation of the first user control by the user.

5. The client computer system of claim 4 wherein the second visible user control contains visible information indicating that actuation of the second visible user control will cause the price in the data field of interest to stop being tracked.

6. The client computer system of claim 1 wherein the web page is for a travel service and is received from a web server that is not part of the client computer system and wherein the price that may change as a function of time is a price for a travel service.

7. The client computer system of claim 1 wherein the visible user control includes visible information indicating that actuation of the visible user control will cause the price in the data field of interest to be tracked.

8. Non-transitory, computer-readable storage media comprising a machine-readable storage medium including executable computer code, the executable computer code when run in a client computer system having a configuration that causes the client computer system to:
  receive a web page from a web page server;
  automatically determine by applying a set of rules whether the received web page contains a data field with a price that may change as a function of time;
  in the event that the web page is automatically determined to contain a data field with a price that may change as a function of time:
    display the received web page on a client display associated with the client computer system with a visible user control that was not part of the received web page overlaid on the web page near the data field with the price that may change as a function of time; and
    in response to actuation of the visible user control by a user of the client computer system, issue a command that causes the price to be tracked as a function of time;
  in the event that the web page is automatically determined not to contain a data field with a price that may change as a function of time, display the received web page on the display without the visible user control overlaid anywhere on the received web page.

9. The non-transitory, computer-readable storage media of claim 8 wherein the tracking comprises:
  determining, after a time, whether the price has changed; and
  storing a change in the price in a database.

10. The non-transitory, computer-readable storage media of claim 8 wherein the user control comprises a link to another web page on a first website, the first website being different from a second website that rendered the web page that includes the data field.

11. The non-transitory, computer-readable storage media of claim 8 wherein the tracking comprises:
  determining, on a periodic basis, whether the price has changed; and
  storing one or more changed prices in a database.

12. The non-transitory, computer-readable storage media of claim 8 wherein the received web page has an address and one of the rules has a configuration that determines whether the received web page contains the data field with a price that may change as a function of time based on the address of the web page.

13. The non-transitory, computer-readable storage media of claim 8 wherein the user control is a first user control and the executable computer code has a configuration when run that causes the client computer system to cause a second visible user control to be overlaid on the received web page instead of and that is different from the first user control in response to actuation of the first user control by the user.

14. The non-transitory, computer-readable storage media of claim 13 wherein the second visible user control contains visible information indicating that actuation of the second visible user control will cause the price in the data field of interest to stop being tracked.

15. The non-transitory, computer-readable storage media of claim 8 wherein the web page is for a travel service and is received from a web server that is not part of the computer system and wherein the price that may change as a function of time is a price for a travel service.

16. The non-transitory, computer-readable storage media of claim 8 wherein the visible user control includes visible information indicating that actuation of the visible user control will cause the price in the data field of interest to be tracked.

* * * * *